US007204025B2

(12) United States Patent
Ziegs et al.

(10) Patent No.: US 7,204,025 B2
(45) Date of Patent: Apr. 17, 2007

(54) HAND-OPERATED TOOL WITH HANDLE

(75) Inventors: Carsten Ziegs, Hamburg (DE); Johannes Lügger, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 10/733,512

(22) Filed: Dec. 11, 2003

(65) Prior Publication Data

US 2004/0172834 A1 Sep. 9, 2004

(30) Foreign Application Priority Data

Dec. 12, 2002 (DE) .......................... 202 19 246 U

(51) Int. Cl.
*B23D 57/02* (2006.01)

(52) U.S. Cl. ........................... 30/381; 30/340; 30/210; 16/110.1; 16/422

(58) Field of Classification Search .................. 30/210, 30/216, 276, 381, 382, 383, 384, 385, 386, 30/387, 520, 523, 524, 525, 340; 16/110.1, 16/430, 426, 422, 900
See application file for complete search history.

(56) References Cited

U.S. PATENT DOCUMENTS

| | | | | |
|---|---|---|---|---|
| 3,844,360 | A * | 10/1974 | Green et al. | 173/170 |
| 4,141,143 | A * | 2/1979 | Hirschkoff et al. | 30/381 |
| 4,382,333 | A * | 5/1983 | Nagashima et al. | 30/381 |
| 4,654,970 | A * | 4/1987 | Nagashima | 30/383 |
| 4,694,578 | A * | 9/1987 | Kemmler | 30/383 |
| 4,856,195 | A * | 8/1989 | Grossmann et al. | 30/369 |
| 4,912,848 | A * | 4/1990 | Bidanset | 30/383 |
| 4,964,217 | A * | 10/1990 | Siede et al. | 30/383 |
| 5,101,567 | A * | 4/1992 | Cool | 30/382 |
| 5,551,157 | A * | 9/1996 | Wu | 30/341 |
| 5,570,512 | A * | 11/1996 | Hoppner | 30/383 |
| 5,738,064 | A * | 4/1998 | Lowe et al. | 123/198 E |
| 5,960,549 | A * | 10/1999 | Hoppner | 30/381 |
| 6,108,867 | A * | 8/2000 | Nagashima | 16/110.1 |
| 6,502,311 | B1 * | 1/2003 | Khachatoorian et al. | 30/162 |
| 2001/0010123 | A1 * | 8/2001 | Taomo et al. | 30/383 |

FOREIGN PATENT DOCUMENTS

| | | |
|---|---|---|
| DE | 34 31 080 C2 | 8/1984 |
| DE | 202 09 522 U1 | 6/2002 |

* cited by examiner

*Primary Examiner*—Timothy V. Eley
*Assistant Examiner*—Omar Flores Sánchez
(74) *Attorney, Agent, or Firm*—Nash & Titus LLC

(57) ABSTRACT

The invention relates to a hand-operated tool with handle (1) with a handle section (2) on the user side and with a foot section (3) arranged on the bottom side of the handle section (2) and with a detachable one-piece upper handle shell (8) that covers at least substantially the handle section (2) on the user side and the foot section (3) on the bottom or ground side.

12 Claims, 3 Drawing Sheets

HAND-OPERATED TOOL WITH HANDLE

FIELD OF THE INVENTION

The invention relates to a hand-operated tool with a handle.

BACKGROUND OF THE INVENTION

Hand-operated tools with handles, e.g., motor-driven chain saws, are sufficiently known.

In commercial chain saws the tank and the handle are designed as a cohesive unit. Tank-handle units in accordance with the state of the art are known that consist of two approximately equally large half shells welded to one another on a welding seam along the axis of motor symmetry. This relatively long welding seam requires a precise manufacture of the two parts. This entails problems of tolerance and large welding systems are required. The bottom of such chain saws is smooth. According to the state of the art chain saws with unequally large half shells are also known. The welding seams are shorter in this instance. However, they have the disadvantage that the handle is open on the hand side and/or the bottom side in order to be able to be manufactured as a one-part injection-molded part. The handle presents sliding problems when the saw is handled and rapidly becomes dirty. In particular, the user can step on a foot section of the handle in order to fix the saw on the ground when starting up chain saws with a traction rope that are driven by a two-cycle motor. The foot section, which is open on the bottom (ground) side, can easily become dirty in this instance.

It is known that the handle section can be covered by an additional component in order to protect the switching mechanism placed in it.

SUMMARY OF THE INVENTION

The invention has the problem of making available a hand-operated tool with handle that can be manufactured in an advantageous manner and nevertheless has a smooth outer skin.

This problem is solved with a generic tool with handle with a handle section on the user side and with a foot section arranged on the bottom side of the handle section and with a detachable one-piece upper handle shell that covers at least substantially the handle section on the user side and the foot section on the bottom (toward the ground) side.

As a result of the bottom-side covering of the handle section by the upper handle shell the saw slides better over the trunk when being handled and also no dirt can penetrate into the bottom section of the handle when the tool is started.

DETAILED DESCRIPTION OF THE PREFERRED EMBODIMENTS

The handle section is covered on the user side by the upper shell. Consequently, any switching mechanism built into it is protected and at the same time readily accessible for service.

The upper shell is a one-part injection molded part that can be economically manufactured. It can comprise functional elements such as eyelets, hooks and the like.

A variant of the hand-operated tool that can be manufactured in an advantageous manner comprises a larger tank half shell onto which a smaller tank half shell is welded in order to form the tank. The welding seam then runs adjacent to the handle. The inner circumference of the handle is injection-molded in one piece.

The handle, that is open on the user side, can be completely covered by the upper handle shell. Thus, the entire handle is smooth, visually appealing and can be manufactured in an advantageous manner.

The foot section has a dovetail guide running in the longitudinal direction of the tool for a simple mounting of the upper handle shell and the upper handle shell has wrap-arounds arranged on its outer side with which the upper handle shell can be shifted in the direction away from the user toward the tool. The upper handle shell can comprise first fastening means in the foot section and/or second fastening means in the handle section.

In a preferred embodiment of the invention the foot section comprises snap [snap-in or catch) hooks that can snap into recesses of the bottom part of the upper handle shell. Screw domes can be provided in the foot section that serve as needed to fasten the upper handle shell. A screw can be inserted through penetration areas provided in the upper handle shell and tightened in the associated screw domes.

The handle section of the upper handle shell is preferably designed as a semitube and comprises two noses arranged at an angle to the operative direction of the screw on the housing-side end in order to draw the upper handle shell onto the handle contour by tightening a screw guided by a borehole arranged on the user side. To this end the noses stand at a suitable angle to the operative direction of the screw.

The inner wall of the handle can have a recess for a gas lever and the upper handle shell can have a recess for a locking key.

The invention is described in an exemplary manner with reference made to three figures.

Figure 1:
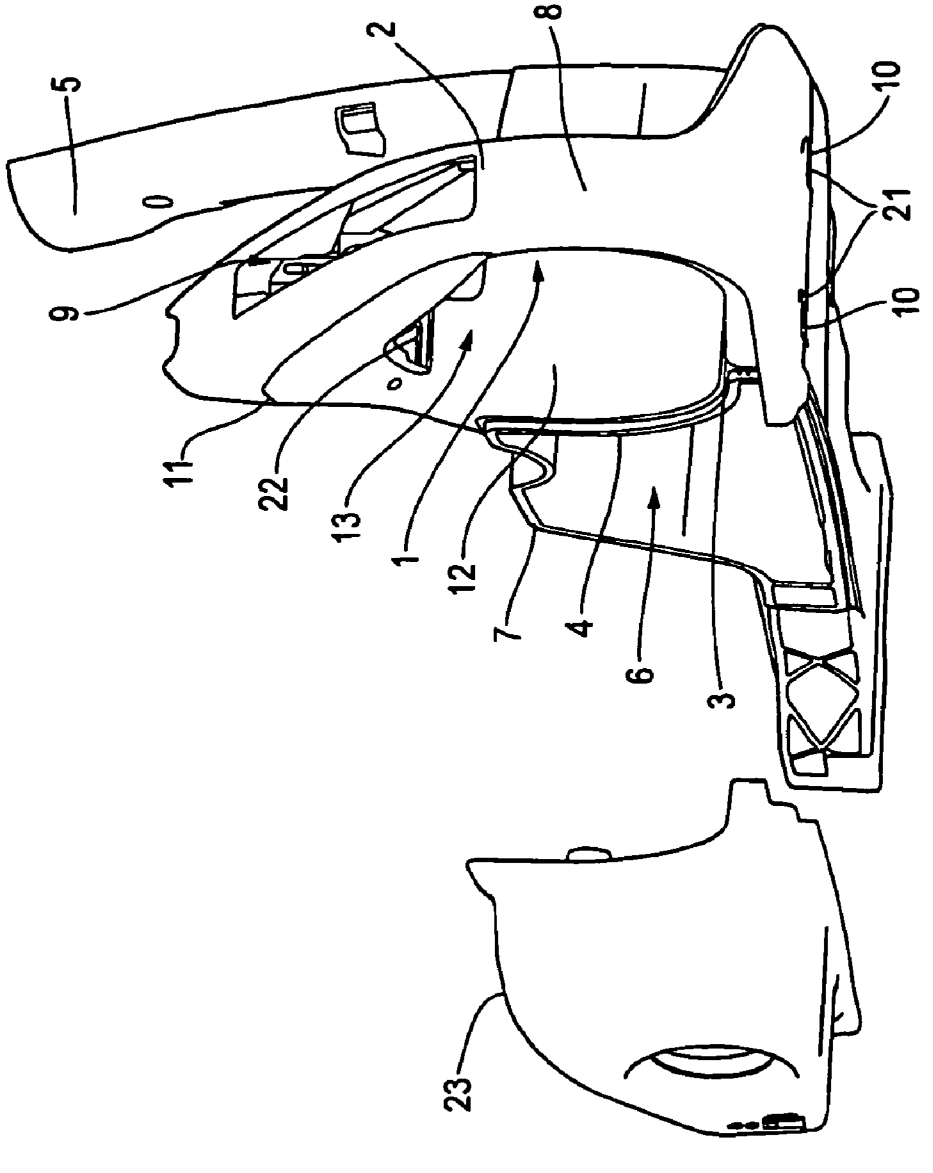
FIG. 1 shows a perspective view of a tank-handle unit for a hand-operated tool in accordance with the invention.

FIG. 1 shows the tank-handle unit as a component of a chain saw. The chain saw is not shown. It is composed of several structural components. The invention can be described in the clearest manner by the tank-handle unit.

The tank-unit comprises handle 1 in the area facing the user. Handle 1 comprises handle section 2 facing the user and comprises foot section 3 on the bottom. The chain saw comprises a two-cycle motor that can be ignited by a traction rope. During the rapid pulling of the traction rope the user can step on foot section 3 with his body weight and fix the chain saw on the ground in this manner.

A large tank half shell 4 with receptacle 5 for a looped (or bracket) handle and inner wall 12 of the handle are injection-molded in one piece. Handle 1 has no welding seams along the circumference of its opening. A small tank half shell 23 can be welded onto open tank 6 of large tank half shell 4. Welding seam 7 runs completely adjacent to handle 1 and opposite receptacle 5 for the looped handle.

Handle 1 is covered on the bottom side and on the user side by a one-part, injection-molded upper handle shell 8. Upper handle shell 8 comprises recess 9 in handle section 2 for a locking key and two recesses 10 in foot section 3 for snap hooks. Upper shell 8 comprises two noses 11 in handle section 2 that run at a suitable angle to the operative direction of the screw. Noses 11 act with a screw run through borehole 20 according to FIG. 3 in the handle section. Inner handle wall 12 runs around handle opening 13 arranged vertically to the longitudinal direction of the chain saw. Inner handle wall 12 is injection-molded in one piece. The inner handle wall 12 may have a recess for a gas lever 22.

Figure 2:
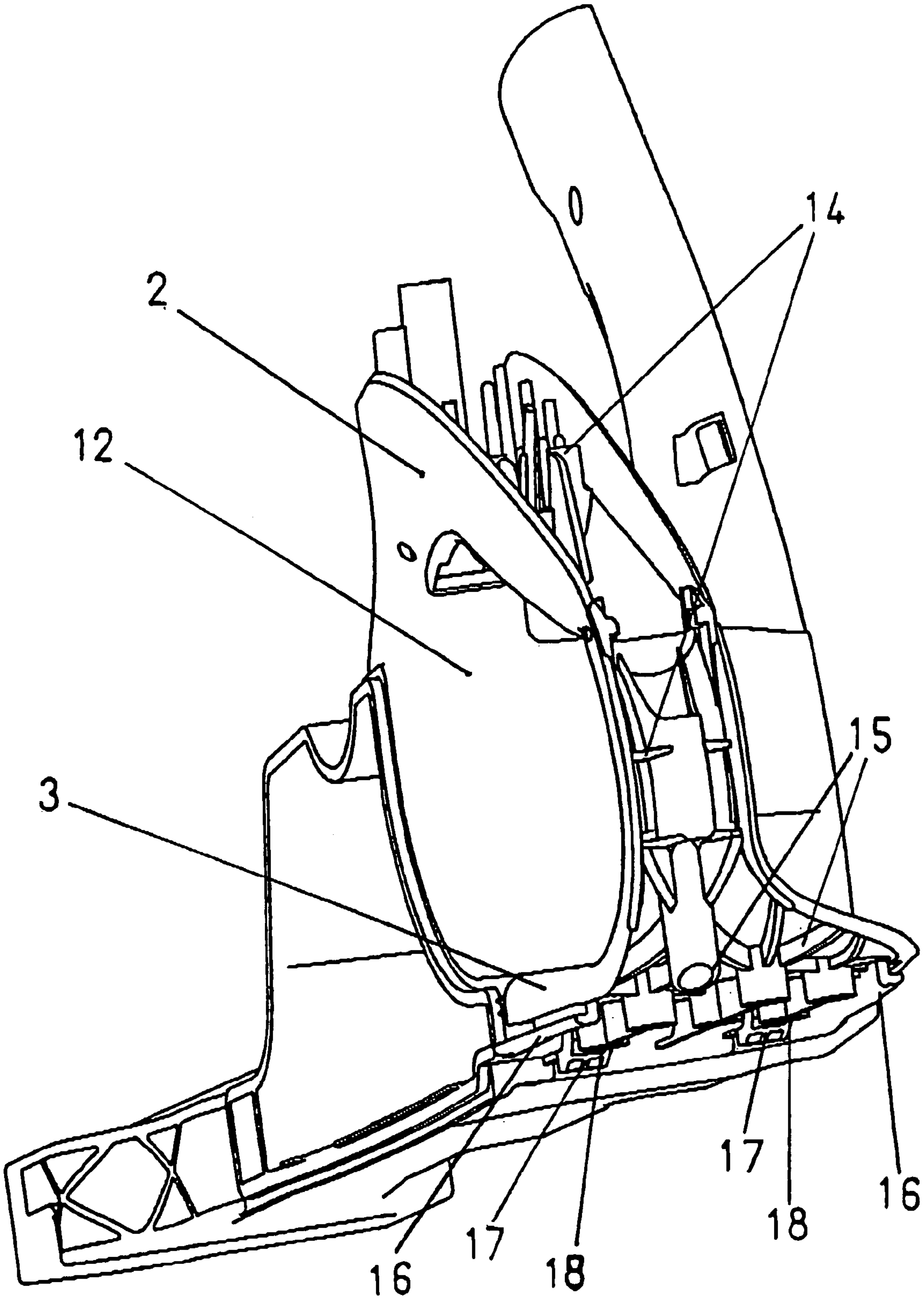
FIG. 2 shows a tank-handle unit according to FIG. 1 with removed upper handle shell.

FIG. 2 shows the tank-handle unit according to FIG. 1 with removed upper handle shell 8. Handle section 2 of inner handle wall 12 is designed substantially like a semitube and bent in the longitudinal direction on the tool side. Several reinforcement ribs 14 are provided on the inner side.

The bottom side of foot section 3 also has a reinforcement profile 15. Reinforcement profile 15 is limited on both sides by dovetail guide 16. Dovetail guide 16 is a bent-up edge of foot section 3. Dovetail guide 16 cooperates with wrap-arounds in foot section 3 of upper shell 8.

Two snap hooks 17 are arranged on the bottom side of foot section 3 that cooperate with the two recesses 10 in the foot area of upper handle shell 8. A screw dome 18 is provided adjacent to each of the two snap hooks 17. If necessary, penetration areas 21 on upper housing shell 8 can be alternatively or additionally penetrated with a screw and tightened in the associated screw domes 18. After upper handle shell 8 has been completely pushed onto dovetail guide 16 the two snap hooks 17 snap into recesses 10. Upper handle shell 8 completely closes off foot section 3 on the bottom and protects it from the entrance of dirt.

Figure 3:
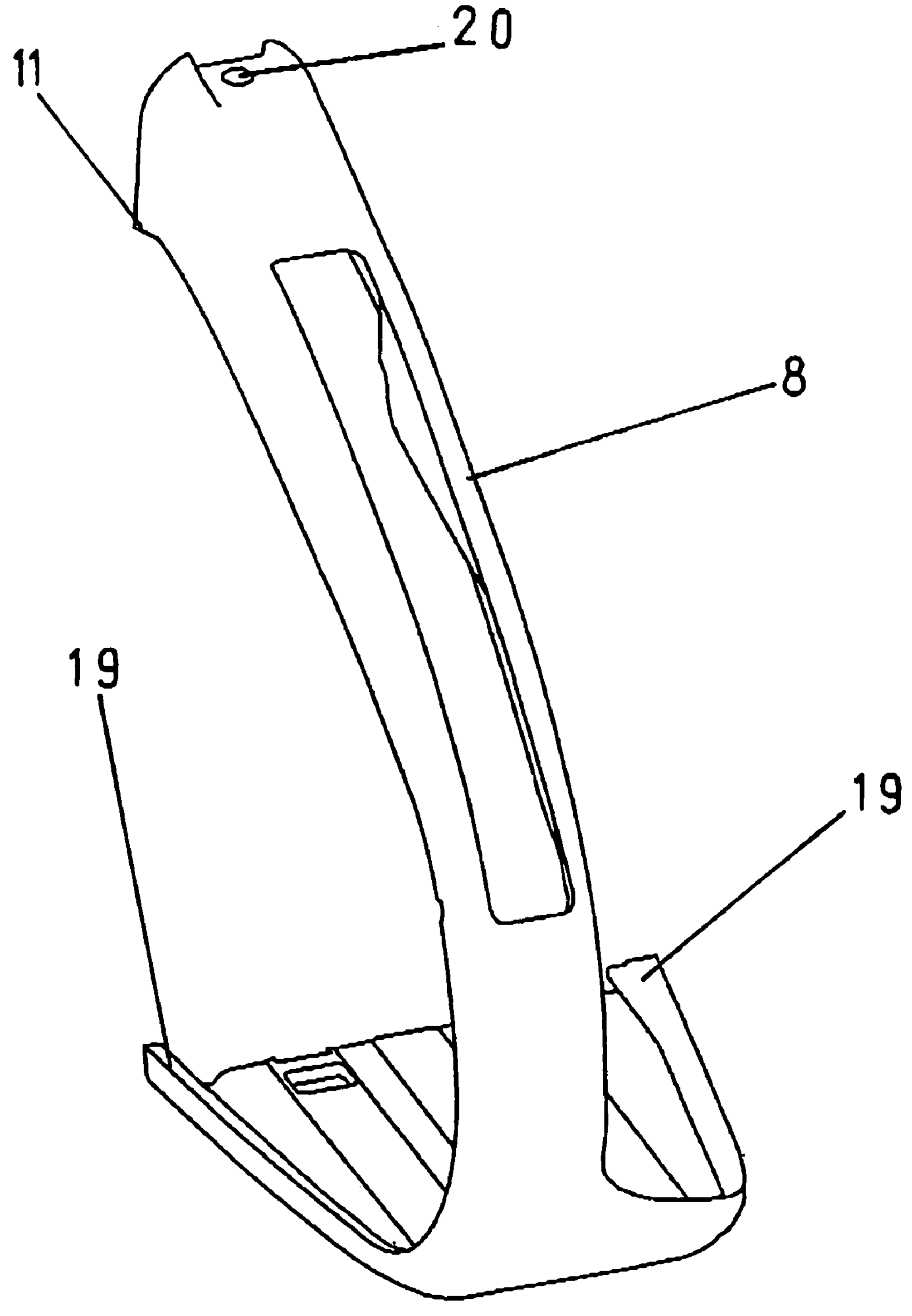
FIG. 3 shows an upper handle shell in accordance with the invention.

FIG. 3 shows removed upper handle shell 8. The upper handle shell is injection-molded in one piece. Two wrap-arounds 19 are provided on the longitudinal side of the foot section. The handle section comprises two noses on its outer end that cooperate with a screw run through upper borehole 20 and draw upper shell 8 tightly onto handle 1.

The invention claimed is:

1. A hand-operated tool having a user side, comprising a handle which comprises a handle portion positioned on the user side and a foot portion for receiving the foot of the user when the hand-operated tool is started and positioned on a bottom side of the handle, and a detachable one-piece upper handle shell that is positioned to cover at least substantially the handle portion on the user side and extends below at least substantially the foot portion.

2. The hand-operated tool according to claim 1, characterized in that the foot portion comprises a reinforcement profile arranged on the bottom side.

3. The hand-operated cutting tool according to claim 1, characterized in that the foot portion comprises a dovetail guide running in the longitudinal direction of the tool and that the upper handle shell comprises wrap-arounds arranged on the outside of the upper handle shell with which the upper handle shell can be shifted in the direction away from a user toward the tool.

4. The hand-operated tool according to claim 1, which further comprises an inner handle wall injection-molded in one piece and running around an opening in the handle.

5. The hand-operated cutting tool according to claim 4, which further comprises a larger tank half shell, wherein the inner handle wall and the larger tank half shell are formed by being injection-molded in one piece, and which further comprises a smaller tank half shell that is welded to the larger tank half shell along a seam running adjacent to the handle so as to form a fuel tank.

6. The hand-operated cutting tool according to claim 4, characterized in that the handle portion is hollow in order to receive a switching mechanism, that the inner handle wall comprises a recess for a gas lever and that the upper handle shell comprises a recess for a locking key.

7. The hand-operated tool according to claim 4, characterized in that the upper handle shell comprises a functional element arranged on the user side.

8. The hand-operated tool according to claim 7, wherein the functional element comprises an eyelet.

9. The hand-operated cutting tool according to claim 1, characterized in that the upper handle shell comprises a first fastening means which covers the foot portion of the handle on the bottom side, and/or a second fastening means which covers the handle portion on the user side of the handle.

10. The hand-operated cutting tool according to claim 9, characterized in that the first fastening means comprises recesses in order to form a snap connection with snap hooks projecting from the bottom of the foot portion.

11. The hand-operated cutting tool according to claim 9, characterized in that the foot portion comprises screw domes projecting from its bottom and that the first fastening means comprises penetration areas in the upper handle shell for screws that can be screwed into the screw domes for fixing the upper handle shell to the tool.

12. The hand-operated tool according to claim 9, characterized in that the second fastening means comprises a borehole arranged on the user side for a screw, and two noses arranged on the end of the tool side at an angle to the operative direction of the screw.

* * * * *